United States Patent [19]

Milana et al.

[11] 3,830,420

[45] Aug. 20, 1974

[54] AUTOMATIC BRAZING WIRE FEEDER

[75] Inventors: Anthony A. Milana, Toms River; Jaime Lehman, Irvington, both of N.J.

[73] Assignee: Kahle Engineering Co., Union City, N.J.

[22] Filed: June 6, 1973

[21] Appl. No.: 367,371

[52] U.S. Cl. ................. 228/9, 226/116, 226/117, 228/41
[51] Int. Cl. .......................... B23k 1/00, B23k 5/00
[58] Field of Search ............... 228/8, 12, 33, 41, 9; 226/108, 116, 117, 161; 219/130, 136

[56] References Cited
UNITED STATES PATENTS

| | | | |
|---|---|---|---|
| 573,035 | 12/1896 | Phelps | 228/41 |
| 1,623,293 | 4/1927 | Williams et al. | 228/12 |
| 3,530,273 | 9/1970 | Bollinger et al. | 228/8 X |
| 3,797,725 | 3/1974 | Mori et al. | 228/41 |

*Primary Examiner*—J. Spencer Overholser
*Assistant Examiner*—Robert J. Craig
*Attorney, Agent, or Firm*—Holland, Armstrong, Wilkie & Previto

[57] ABSTRACT

An improved automatic brazing wire feeder is disclosed for use in brazing, soldering or similar fastening operations. A movable carriage is provided on a support cabinet for feeding one or more lengths of brazing wire to the article being brazed as the article is advanced to the wire feeder on a conveyor. A detector on the wire feeder senses the arrival of the article to be brazed and initiates a controlled forward movement of the carriage to move the wire into position adjacent to the article. An automatic control system then preheats the end of the brazing wire, advances the wire for the brazing operation, and next withdraws the end of the brazing wire from the heating flame and away from the fastened article at the termination of the brazing operation and before the carriage is moved away from the brazed article.

9 Claims, 8 Drawing Figures

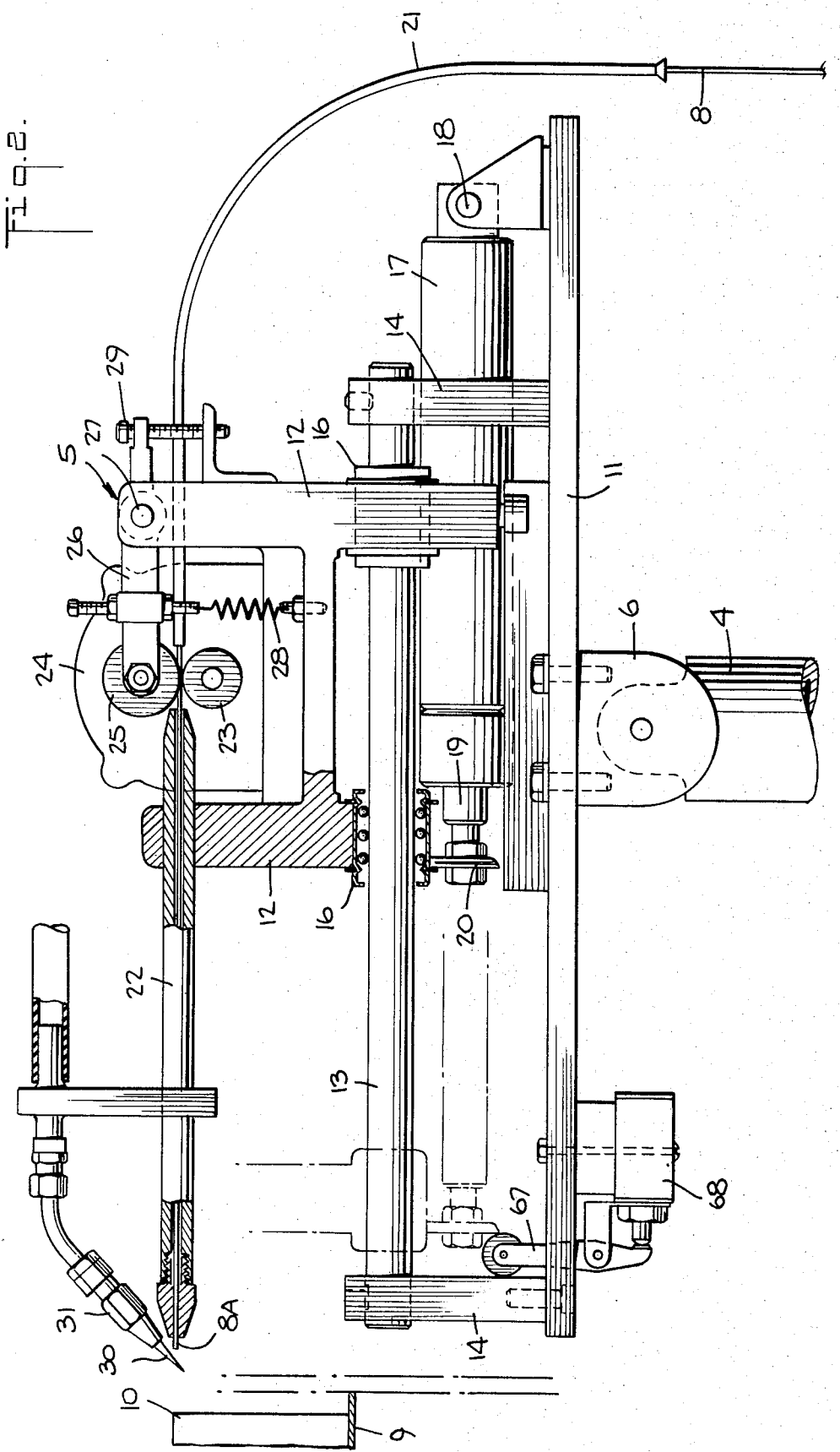

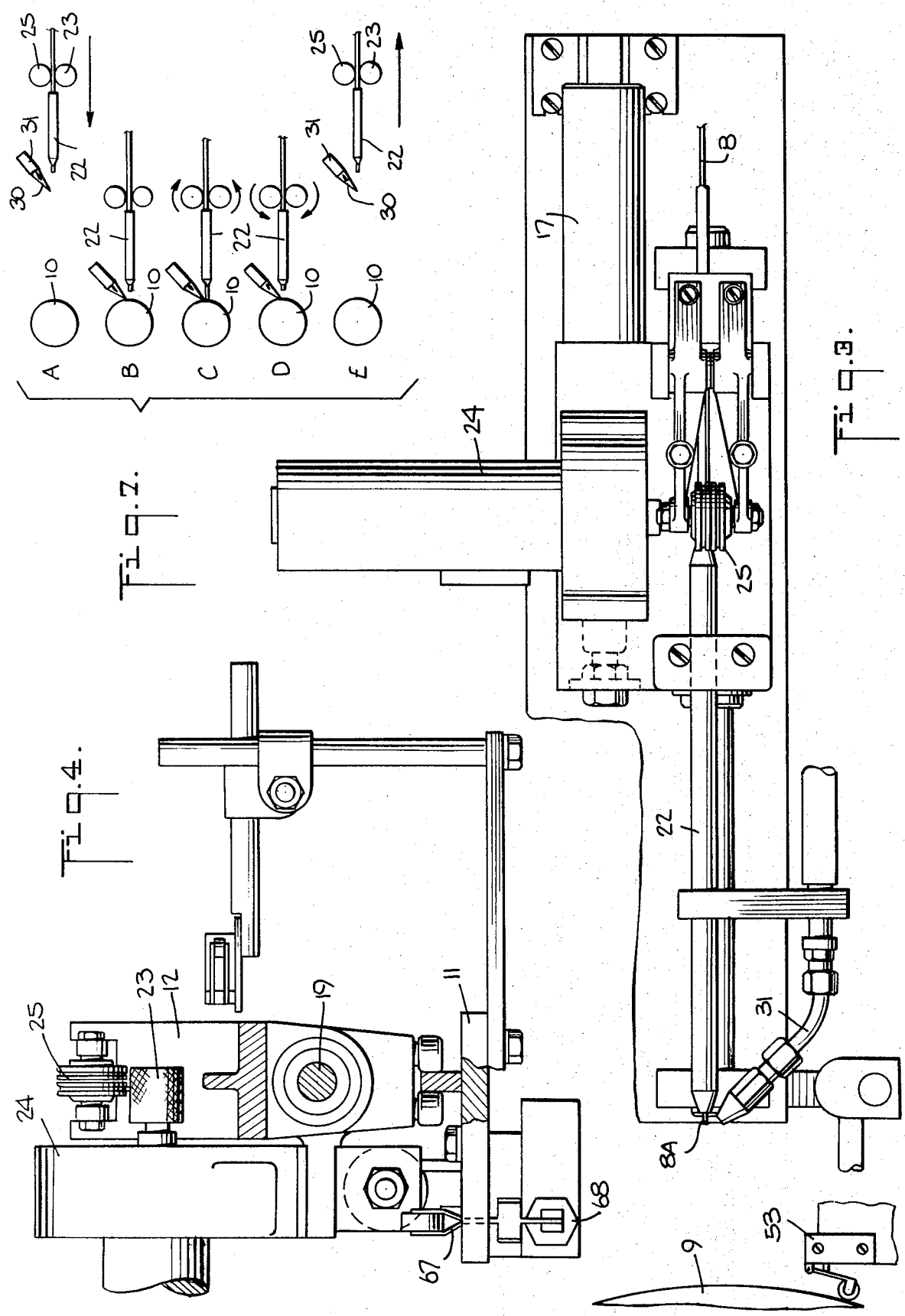

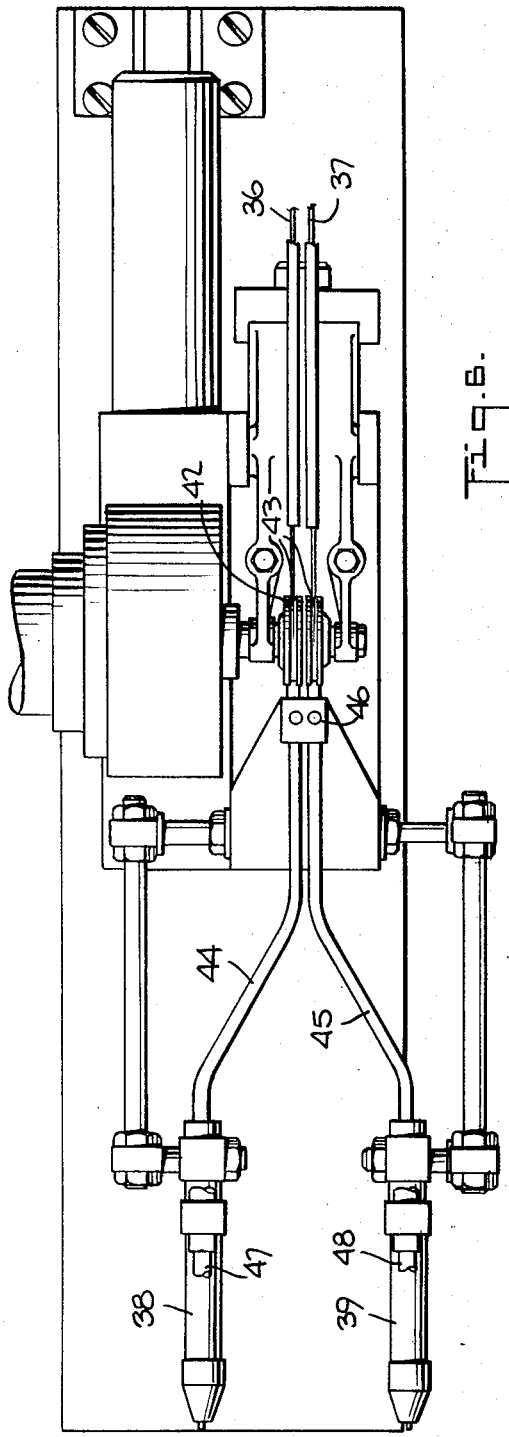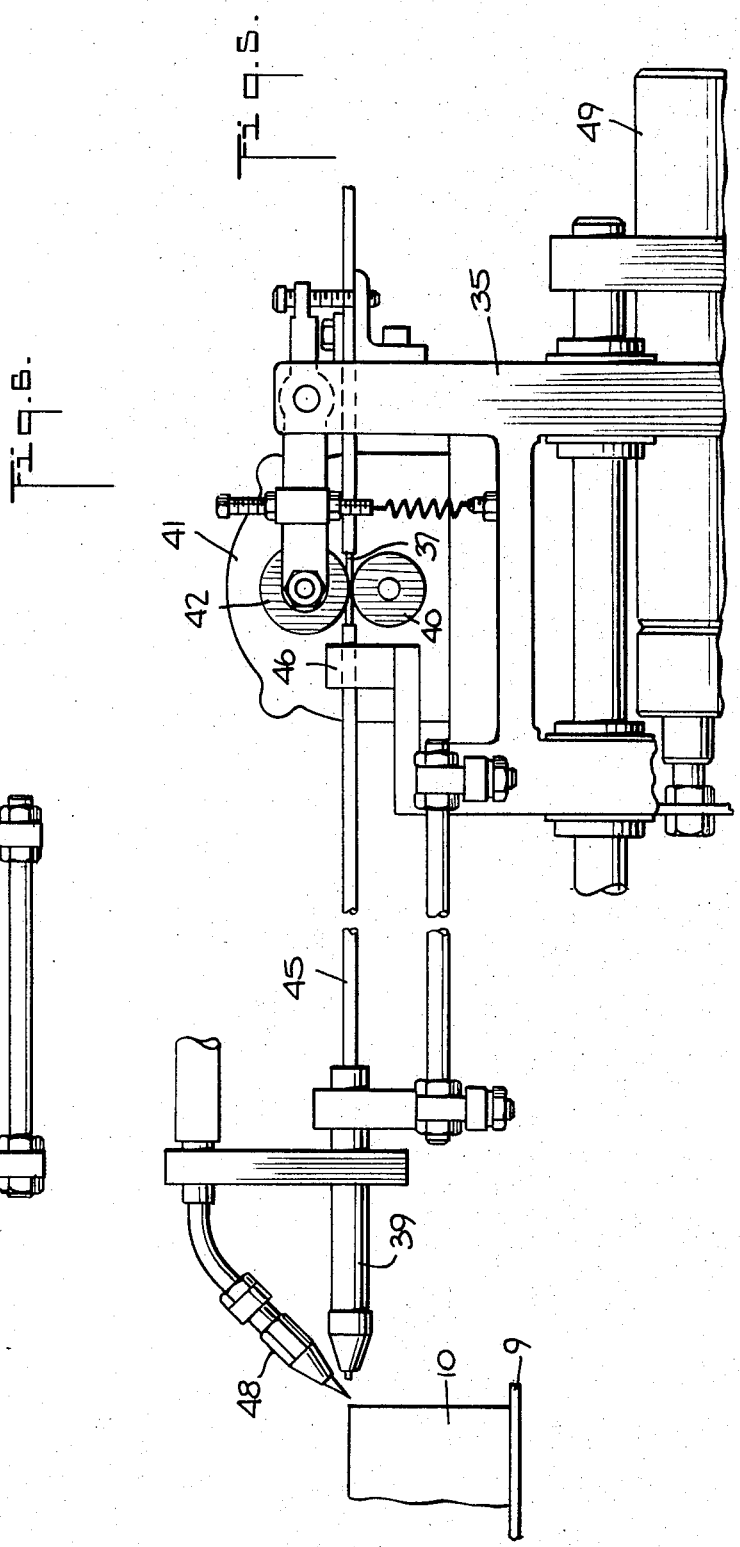

AUTOMATIC BRAZING WIRE FEEDER

BACKGROUND OF THE INVENTION

The present invention relates to the metal fastening art, such as brazing or soldering or welding, and more particularly to means for feeding a brazing or other fastening wire to the fastening point and for an automatically controlled melting of the wire at that point.

An improved automatic system is disclosed which in particular includes improved wire moving means operating in an automatically timed sequence to provide for a trouble free fastening operation using a precisely controlled quantity of fastening wire.

In order to provide for increasing speeds in brazing or other fastening operations such as are performed in automated or semi-automated fastening lines, a need has developed for efficient automatic wire feeder. For successful use, this automatic feeder must perform a number of operations previously done by hand or by relatively slowly moving feeders and must at the same time feed an exact length, i.e. volume of the wire and provide an efficient and effective melting of the wire at the article being handled.

These features are provided in the present invention through the use of an automated and timed wire feeding combined with a cooperating action of a feeder mounted wire heating flame.

A preheating of the wire is provided which facilitates the brazing or other fastening operation by eliminating any need for overheating the article being fastened.

The use of this feeder permits fully automatic brazing operations of high efficiency which eliminate the need for an operator and which also eliminate the objectionable variations necessarily introduced into brazing or other fastening operation due to the human factors in nonautomated welding stations.

Accordingly, an object of the present invention is to provide an improved automatic feeder for fastening operations, such as brazing or soldering or similar operations.

Another object of the present invention is to provide an automatic wire feeder for use in automatic conveyor-type article fastening lines.

Another object of the present invention is to provide an automatic charge feeder for feeding charges of predetermined volume to a fastening position.

Another object of the present invention is to provide a reliable and relatively simple automatic wire feeder for soldering and brazing operations.

Another object of the present invention is to provide an improved multi-wire feeder for automatic fastening lines.

Another object of the present invention is to provide an improved preheating of the fastening wire so that correct fastening temperatures are provided resulting in minimum fastening times and maximum production rates.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing forming a part of the specification, wherein:

FIG. 2 is an enlarged detailed side elevational view partially in section of the feeder carriage.

FIG. 3 is a top plan view of the feeder carriage of FIG. 2.

FIG. 4 is a vertical sectional view of the feeder carriage.

FIG. 5 is a side elevational view illustrating an alternative embodiment for feeding two wires.

FIG. 6 is a top plan view of the embodiment of FIG. 5.

FIG. 7 is a diagrammatic illustration of the several carriage and wire positions during a fastening cycle.

DESCRIPTION OF THE PREFERRED EMBODIMENT

A description of the preferred embodiment of the feeder will now be given. The embodiment illustrated in FIGS. 1 through 5 and 7 will first be described. This embodiment comprises a device for feeding a single wire to the article being fastened. Thereafter, an alternate embodiment illustrating a multi-wire feed as illustrated in FIG. 6 will be described.

Figure 1:
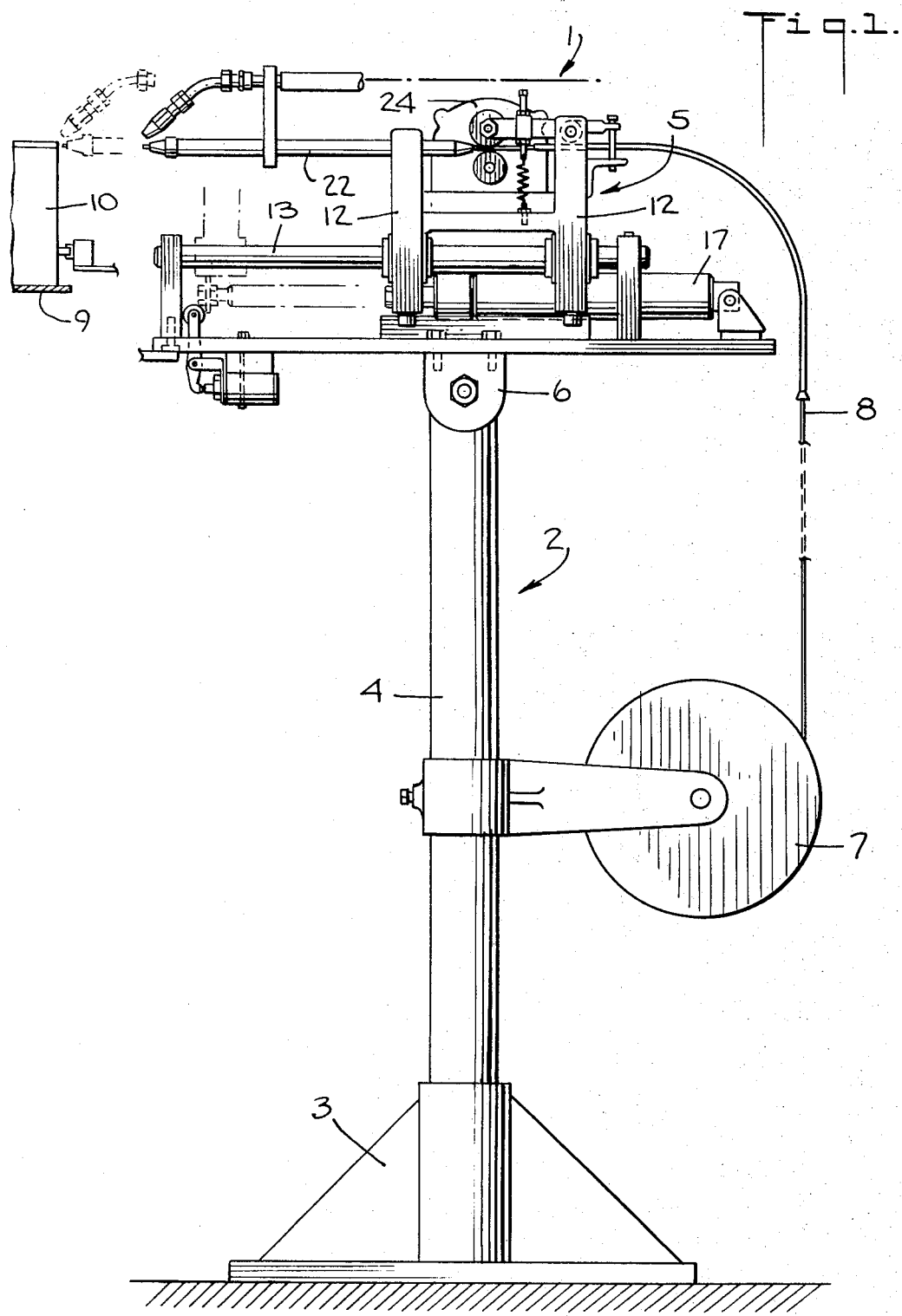
FIG. 1 is a side elevational view of a preferred embodiment of an improved wire feeder in accordance with the present invention.

As illustrated in FIG. 1, the preferred embodiment of the feeder 1 comprises a support or stand 2 including a base 3 and a vertical support post 4. A wire feeding head 5 is adjustably positioned on the post 4 by means of a mounting bracket 6. A supply pool 7 for the brazing or other wire 8 is detachably mounted on the lower portion of the stand 2 permitting the wire 8 to be run upwardly to the wire feeding head 5.

The stand 2 is positioned adjacent to the article feed turret or other conveyor means 9 which periodically presents the articles 10 being fastened to the wire feeder 1. Suitable means (not shown) are provided in advance of the wire feeder 1 for applying a flux to the articles 10 and for thereafter heating the articles 10 preparatory to their presentation to the wire feeder 1.

The Wire Feeding Head

A preferred embodiment of the wire feeding head 5 will now be described with particular reference to the detailed illustrations of the head 5 in FIGS. 2 through 5. The operating members of the wire feeding head 5 are mounted on a mounting plate 11 which is adjustably attached to the support post 4 by the bracket 6. The movement of the wire 8 towards and away from the article 10 being fastened as well as the controlled advance and retraction of the wire 8 during the wire melting cycle are controlled by a wire feeding carriage 12. The carriage 12 is slidably mounted on the mounting plate 11 on a horizontal carriage support rod 13 attached to spaced support brackets 14. The carriage 12 includes spaced bearings 16 slidably engaging the support rod 13 and permitting the carriage 12 to be moved towards and away from the article 10 under the control of a carriage drive motor 17. The drive motor 17 is an air cylinder with one end pivotally attached at 18 to the mounting plate 11 and with its piston 19 coupled at 20 to a carriage 12.

The brazing or other fastening wire 8 is supplied by the supply spool 7 on the machine base 3 with the end of the wire 8 being fed upwardly through a curved guide tube 21 attached to the carriage 12. The wire 8 passes out of the upper end of the guide tube 21 and is then directed through a wire feed tube 22 which is fixedly attached to the carriage 12.

Movement of the carriage 12 under the control of the above described drive motor 17 carries the wire 8 towards and away from the articles 10 being fastened with the exposed end portion 8A of the wire 8 at the end of the wire feed tube 22 being positioned by the feed tube 22.

The movement of the wire 8 along the feed tube 22 during the brazing operation, which will be described more fully below, is controlled by a knurled drive drum 23 supported on and driven by an electric motor 24 and a grooved pinch roller 25 which holds the wire 8 in engagement with the knurled drum 23. The grooved pinch roller 25 is rotatably mounted at the end of a mounting arm 26 which is pivotally attached to the carriage at 27. The grooved pinch roller 25 is urged into its gripping relationship with the wire 8 by a coil spring 28 which is coupled between the mounting arm 26 and the carriage 12. An adjustable stop 29 is threadedly coupled to the carriage 12 and passes through a suitable slot in the mounting arm 26. The stop 29 limits the downward movement of the grooved pinch roller 25 in the absence of the wire 8 to prevent unintentional contact between the grooved pinch roller 25 and the knurled drive drum 23 when there is no wire 8 between the grooved pinch roller 25 and the drum 23.

The electric drive motor 24 is mounted on the carriage 12 for movement therewith and is coupled to the control system which will be further described.

The Alternate Embodiment for a Plurality of Fastening Wires

FIGS. 5 and 6 illustrate an alternate embodiment showing a carriage 35 generally similar to that described above, which has been modified for two wires 36 and 37. Two wire guide tubes 38 and 39 direct the fastening wires 36 and 37 to the fastening position. In this embodiment, the knurled drive drum 40 on motor 41 is made sufficiently wide to engage the spaced wires 36 and 37 and a grooved roller 52 is provided with a groove 43 for each of the wires 36 and 37.

In order to facilitate the advancing of the wires from the knurled drum 40 and through the wire guide tubes 38 and 39, suitably shaped guide tubing 44 and 45 is mounted between a support 46 adjacent to the knurled drum 40 and the in-feed end of the spaced wire guide tubes 38 and 39. In other respects including preheating nozzles 47 and 48 and carriage drive motor 49, this embodiment is generally similar to the single wire feeder described above, both with respect to the wire feeding head and the automatic control system.

The Control System

The wire feeder has an improved automated wire moving cycle which facilitates the fastening operation by providing a precisely controlled feed and melt of the wire and which includes an initial wire heating treatment and feed and withdrawal steps.

In an initial step in the fastening process (FIG. 7A), the entire carriage 12 is moved towards the article 10 to be fastened so that the wire 8 within the tube 22 and which is gripped by the drum 23 and roller 25 is carried toward its brazing position. Meanwhile, the wire melting flame 30 from the nozzle 31 remain directed through the path of the wire 8 but spaced from the wire end 8A.

The wire feed tube 22 is now in the position illustrated in FIGS. 5 and 7B.

Next, the fastening operation is performed as the wire 8 is advanced by means of the motor driven knurled drum 23 (FIG. 7C). The preheating of the wire 8 as it passes through the flame 30 together with the contact of the wire 8 with the heated article 10 causes the wire to be melted as the wire is driven forward against the article 10. The control system timer is set to advance a sufficient length of wire 8 to the article 10 to provide a melted volume of the wire 8 sufficient for the desired fastening operation.

When this amount of wire 8 has been fed, the forward motion of the knurled drum 23 is reversed and the wire is withdrawn away from the article 10 a short distance (FIG. 7D), thus terminating the melting operation and withdrawing the end 8A of the wire 8 out of the flame 30 of the melting nozzle 31.

Simultaneously, the carriage 12 together with the wire guide tube 22 and the wire 8 are returned to their initial or withdrawn positions as illustrated in FIGS. 1 and 7E.

The above operation is performed within the time of one conveyor advance cycle. The fastened article 10 is now carried away from the fastening position by the conveyor and the next article 10 is moved into the fastening position where it engages the system activating switch to initiate another fastening cycle.

Figure 8:
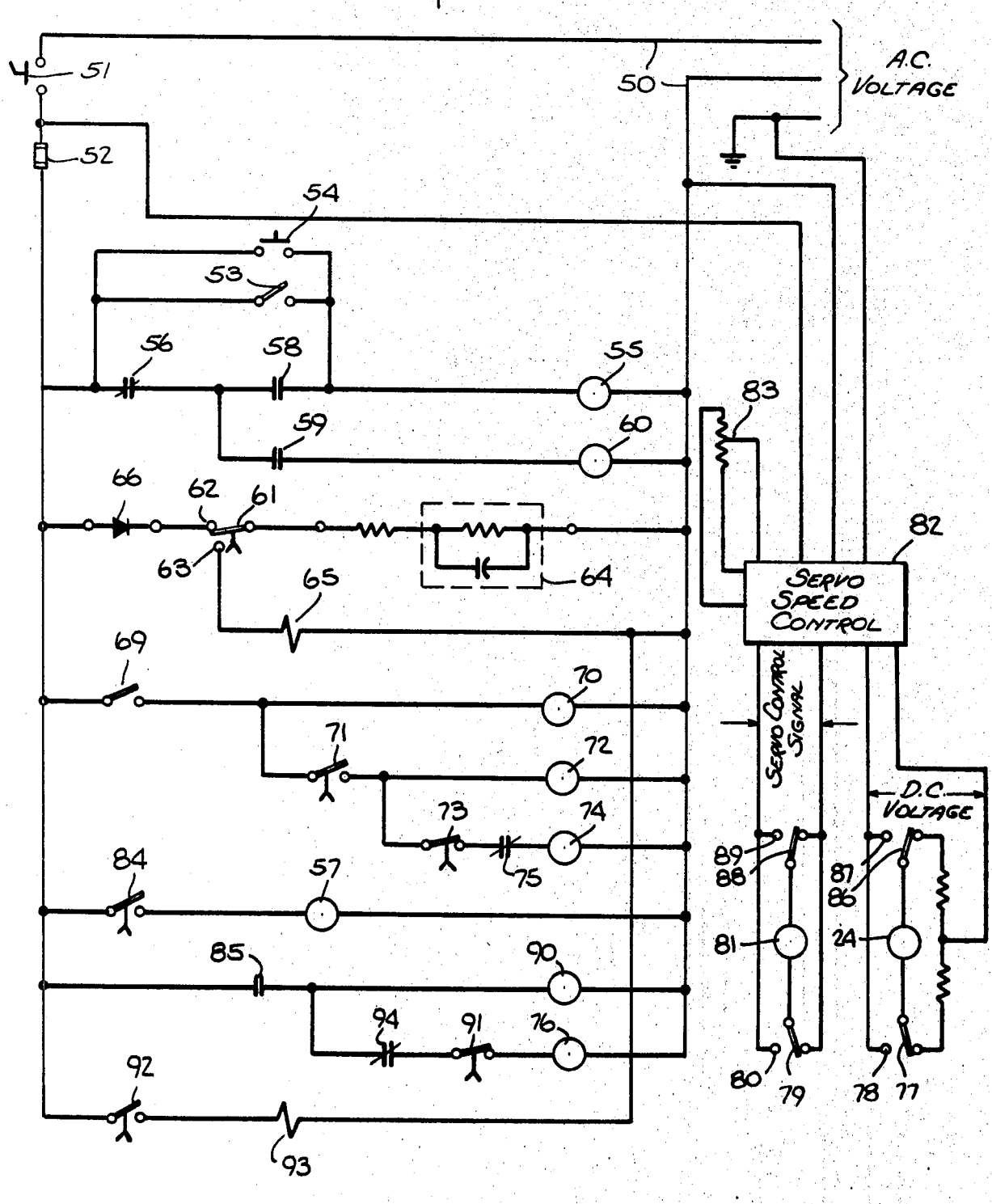
FIG. 8 is a schematic diagram of a preferred embodiment of the control system for the wire feeder.

FIG. 8 illustrates a preferred embodiment of the control system whose general operation has been described above and whose detailed operation will now be further described.

The preferred layout of the electrical control system for the wire feeder is illustrated in FIG. 8. This system comprises a number of switch control relays and associated timers for causing a programmed movement of the wire 8 toward and against the article 10 being brazed together with a preferred positioning of the wire with respect to the wire melting flame 30.

As already described, the wire 8 is fed through the guide tube 22 which is mounted on the carriage 12 which is moved towards and away from the articles 10 being fastened by a cylinder drive motor 17. The automatic electrical control system provides for a controlled movement of the motor 17 as well as for the movement of a separate wire advance system by the wire drive motor 24 mounted on the carriage 12 for movement therewith.

The power for the control system is preferably an AC voltage and spaced voltage supply lines 50 are illustrated at opposite sides of FIG. 8. An on-off switch 51 and fuse 52 illustrated in FIG. 8 and are provided at a convenient position adjacent to the apparatus. The initiation of the brazing operation is controlled by a detector switch whose control arm 53 is positioned to be engaged at the proper instant either by the article 10 being fastened or by an adjacent portion of the article supporting turret or conveyor. A parallel external and manually operated switch 54 may also be provided with its control being mounted in a position adjacent the apparatus.

When either of these two switches 53 or 54 is closed, power is applied to the solenoid of relay 55. A latch voltage also is applied to relay 55 through a normally closed contact 56 of relay 57 and a contact 58 on relay 55. This latching circuit operates to keep the relay 55 closed upon the opening of either of the above described detector switches 53 and 54.

A second contact 59 on relay 55 connects the timer 60 to the AC voltage initiating the time operation so that its contact 61 moves from terminal 62 to terminal 63 after a predetermined period applying an operating electrical pulse from the voltage storage element or pulse pack 64 to the motor 17 advance coil 65. This charge has previously been stored through a rectifier 66 to provide a suitable control signal which acts through the advance coil 65 of the air motor 17 control to extend the piston 19 of the air motor 17 moving the carriage 12 to its operating position adjacent to the article 10 being soldered.

When the air motor 17 has moved its piston 19 and the attached carriage 12 to its fully advanced position, the outer end of the piston 19 engages the control arm 67 for switch (FIG. 2) closing its contact 69 and applying power to a time delay device 70. The contact 71 of this timer is set to close an adjustable interval after carriage 12 has reached its fully extended position and after carriage 12 is fully at rest. This interval is adjustable to insure the proper heating of an article 10 at the brazing station by a flame at that station. The contact 71 of timer 70 in turn applies voltage to a timer 72 and to the motor control solenoid 74. Timer contact 73 remains closed for an adjustable period energizing motor control relay 74 through a normally closed contact 75 on motor reverse relay 76.

The contact 77 on the motor control relay moves to voltage contact 78 energizing drive motor 24 for the adjustable short period to provide for the advance of the wire 8 into through flame 30 and against the article 10. The period set in motor timer 72 determines the length of wire 8 fed.

Preferably, a second contact 79 on relay 74 also moves to a contact 80 to couple a generator 81 to a servo control 82 for the motor. Generator 81 is coupled to and turns with the drive motor 24 to provide for motor speed control with a speed adjustment resistor 83 being provided for the servo control 82.

When the feed period for timer 72 ends, contact 73 opens as a second contact 84 on the timer 72 closes. Contact 84 energizes solenoid 57 which opens the latching contact 56 and which closes a second contact 85 to energize the motor reverse solenoid 76. The normal time delay or response time required for solenoid 57 to act provides for a dwell period for motor 24 between forward and reverse drive.

Solenoid 76 contact 86 is moved to terminal 87 to reverse the drive motor 24 and an additional contact 88 on the solenoid 76 couples the servo control signal generator 81 to terminal 89 for the servo control 82 to control the reverse speed.

The closing of contact 85 also energizes timer 90 which has its time interval set to control the motor reverse cycle or the amount by which the wire 8 is drawn back. When this time elapses the timer 90 contact 91 opens cutting off the drive motor 24. A second contact 92 on the motor reverse timer 90 simultaneously closes to energize the motor 17 return control solenoid 93.

A normally closed contact 94 on the motor forward drive solenoid 74 is opened during forward motor movement to insure against a reverse signal being applied to motor reverse solenoid 76.

Similarly, a normally closed contact 75 on the motor reverse solenoid 76 prevents a signal from reaching the motor forward solenoid 74 during the motor reversing operation.

The advance of the wire 8 by the drive motor 24 under the control of timer 72 may be divided into two steps with a short initial advance for a preheating by flame 30 and with the longer brazing advance described above.

It will be seen that an improved wire feeder has been disclosed for providing for an efficient high speed automatic brazing or similar fastening operation. The support and feed for the brazing wire includes adjustable drives and time delays for controlling both the wire movement and the wire and article heating so that a precise brazing or similar operation is carried out with precisely controlled wire feed or volume melt control. This provides for an efficient automatic system and for a strong and precise bonding.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An improved automatic brazing wire feeder including means for intermittently moving the end of a brazing wire against an article being brazed the improvement comprising:
   a carriage movably mounted on the feeder for movement to and from the article,
   a drive motor coupled to said carriage for providing said movement,
   a wire feed tube on said carriage for positioning the end of the wire,
   a wire advance drum on said carriage positioned in advance of said feed tube,
   an electric motor coupled to said drum,
   a wire heating nozzle provided with a heating flame mounted on said carriage positioned at an outlet end of said feed tube, and
   a control system coupled to said drive motor and to said electric motor actuated by an article detecting switch and including means for advancing the carriage toward the article and for thereafter advancing the end of the wire into the nozzle flame and against the article and then withdrawing the wire from the article and out of the flame and finally returning the carriage.

2. The automatic wire feeder as claimed in claim 1 which further comprises said control system including means for drawing said wire away from said article and backwardly relative to said wire feed tube prior to the returning of the carriage.

3. The automatic wire feeder as claimed in claim 1 which further comprises said nozzle being mounted on the feed tube.

4. The automatic wire feeder as claimed in claim 1 which further comprises a servo-speed control in said control system electrically coupled to a generator operatively attached to said electric motor.

5. Th automatic wire feeder as claimed in claim 1 which further comprises a delay device for providing an adjustable time interval between the termination of the carriage advance towards the article and the advancing of the end of the wire into the flame and against said article.

6. The automatic wire feeder as claimed in claim 1 which further comprises a plurality of wire supports and wire feed tubes with means for directing said plurality of wires against said drum to provide for a plurality of simultaneous brazing operations.

7. The automatic wire feeder as claimed in claim 1 in which said means in the control system for advancing said wire end comprises means for advancing the wire first to the heating nozzle and thereafter to the article.

8. The automatic wire feeder as claimed in claim 1 in which said wire advance drum has a knurled surface.

9. The automatic wire feeder as claimed in claim 8 which further comprises a grooved roller positioned at said drum for forcing the wire against said drum.

* * * * *